United States Patent [19]

Scillieri et al.

[11] 4,099,181

[45] Jul. 4, 1978

[54] FLAT RADAR ANTENNA

[75] Inventors: Antoine Scillieri, Houilles; Jean Yves Aubry, Vaucresson, both of France

[73] Assignee: Electronique Marcel Dassault, Paris, France

[21] Appl. No.: 749,186

[22] Filed: Dec. 9, 1976

[30] Foreign Application Priority Data

Dec. 9, 1975 [FR] France ............................... 75 37622

[51] Int. Cl.[2] ............................................... G01S 3/32

[52] U.S. Cl. .................................. 343/16 M; 343/876

[58] Field of Search ............................. 343/876, 16 M

[56] References Cited

U.S. PATENT DOCUMENTS

| | | | |
|---|---|---|---|
| 2,745,099 | 5/1956 | Bollinger et al. ................ | 343/876 X |
| 2,751,586 | 6/1956 | Riblet ........................... | 343/16 M X |

*Primary Examiner*—Maynard R. Wilbur
*Assistant Examiner*—Richard E. Berger
*Attorney, Agent, or Firm*—Ferrill and Logan

[57] ABSTRACT

Flat radar antenna for radar apparatus comprising a plurality of aligned radiating elements disposed in parallel rows, in which the quantity of energy flowing between each one of said elements and the radar apparatus can be adjusted, characterized in that said radiating elements are waveguides with coplanar radiating faces, said waveguides being grouped according to four quadrants, each one of said quadrants being connected with the radar apparatus by means of a feed device adapted to take on one of two conditios, one in which it feeds all the waveguides in the quadrant and the other in which it feeds only the rows nearest to the center of the antenna excluding the other waveguides in the quadrant, means being provided for the four feed devices to take on at the same time the same condition, so that the radar antenna emits a radar beam which is symmetrical relatively to the center of the antenna, and having a different configuration according to the condition of the feed devices.

6 Claims, 9 Drawing Figures

FLAT RADAR ANTENNA

This invention has as its object a flat antenna for radar apparatus.

It can be useful for certain applications for a radar beam to take on various configurations.

It has been suggested for this purpose to cause a radar beam to vary by feeding a radar flat antenna comprising a plurality of aligned radiating elements disposed in parallel rows, the quantity of energy flowing between each one of said elements and the radar circuit being adjustable by means of phase shifters adjustable in a continuous manner.

The problem with which this invention is concerned is to provide a radar beam adapted to take on one or the other of two configurations.

The application of the previously known embodiment is unconceiveable owing to its complexity and to its high cost.

This invention fills this gap. It provides for the realisation of a radar apparatus flat antenna comprising a plurality of waveguides disposed in parallel rows, the waveguides being grouped in four quandrants, each one of said quandrants being connected to the radar apparatus by means of a feed device adapted to take on two conditions, one in which it feeds all the waveguides of a quandrant and the other in which it feeds only the waveguides in the quandrant located in the rows which are nearest to the centre of the antenna exluding the other waveguides in the quadrant, means being provided for the four feed devices to take on at the same time the same condition, so that the radar antenna may emit a beam which is symmetrical with respect to an axis passing through the centre of the antenna, and having a different configuration according to the condition of the feed devices.

This invention finds a particularly interesting application in the case of flat circular antennas. It is then possible to obtain at will a beam with circular cross-section or a beam with substantially elliptical cross-section.

According to an embodiment, in order to feed a quadrant of such an antenna, a device is provided comprising a first feed waveguide feeding the waveguides in the most distant rows and a second feed waveguide feeding the waveguides in the rows nearest to the centre of the antenna, as well as a two way waveguide switch, which in its first position feeds limitatively the second feed waveguide and which in its second position feeds the first feed waveguide, a derivation of the first feed waveguide being provided to feed the second feed waveguide via the switch.

In the following description given as an example, reference is made to the accompanying drawings in which.

Figures 1, 2, 3:
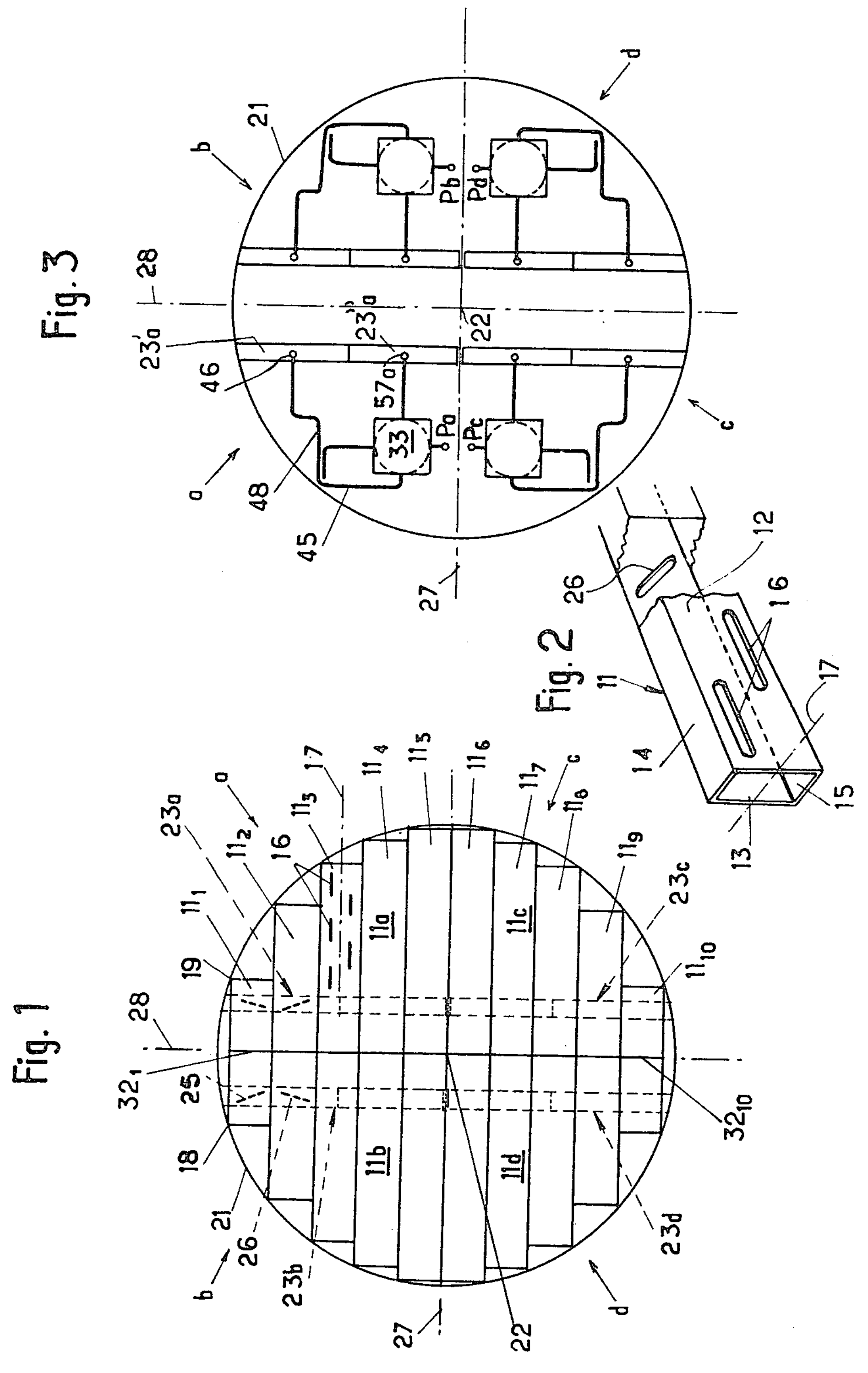
FIG. 1 is a schematic front view of a flat antenna according to this invention.
FIG. 2 is a perspective view of a portion of a radiating waveguide.
FIG. 3 is a schematic view of the back face of the antenna.

The flat antenna comprises, in the usual way, waveguides 11 (FIG. 1) placed side by side, ten in number in the antenna shown, $11_1$-$11_{10}$. Each waveguide comprises a parallelepipedic tube, with larger faces 12 and 13 (FIG. 2) and smaller faces 14 and 15. A larger face, 12 for instance, is turned towards the space where the radar energy is to be radiated or collected and it is provided with slots 16 disposed according to two rows on each side of a middle plane 17 parallel to the lesser faces, the spacing of the slots being equal to half the wavelength inside the guide of the energy to be radiated or collected.

The waveguides are placed side by side adjacent their smaller faces 14 and 15 and the lengths of the successive waveguides $11_1$-$11_2$ are such that their ends 18, 19 are located on a circumference 21 with center 22.

Figure 4:
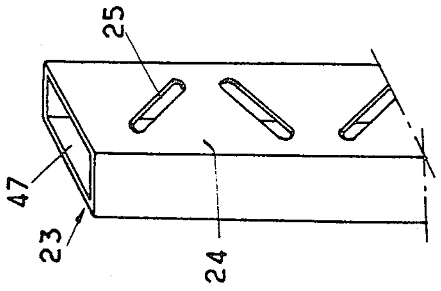
FIG. 4 is a perspective view of a portion of a feed waveguide.

In a known manner, the radiating waveguides 11 are fed from feed guides, also with rectangular cross-section 23 (FIG. 3) a larger face 24 (FIG. 4) whereof contacts the back faces 13 of the radiating waveguides 11, the communication being ensured by means of oblique overlaying slots 25 and 26, which the faces 24 of the waveguides 23 and the faces 13 of the radiating waveguides 11 respectively have thereon.

Figure 5:
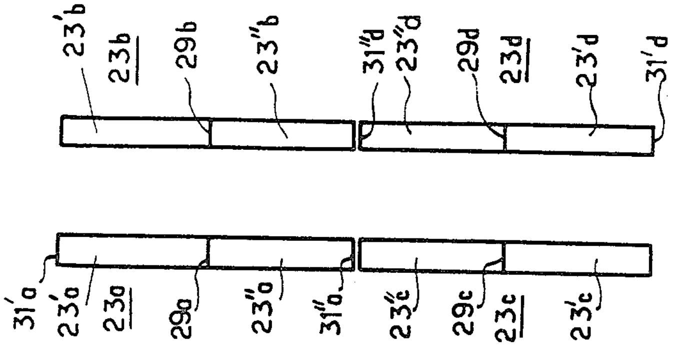
FIG. 5 is a rear view of a set of feed waveguides.

This invention provides to divide the feed waveguides 23 into four waveguide portions *23a, 23b, 23c, 23d* respectively (FIG. 5), affected respectively to the radiating waveguide portions *11a, 11b, 11c, 11d* of the four circumference quadrants defined by a diameter 27 parallel to the faces 14 and 15 and by a diameter 28, each one of the portions 23 being in turn divided into two elements *23'a, 23"a, 23'b, 23"b, 23'c, 23"c, 23'd, 23"d* by transverse partition walls *29a, 29b, 29c, 29d* respectively. Each one of the elements 23 is bounded by end partition walls *31'a, 31"a . . . 31'd, 31"d.*

Each one of the radiating waveguides 11 is moreover divided into two equal portions by means of partition walls $32_1$ . . . $32_{10}$ aligned along a diametrical plane containing the diameter 28.

To the radiating waveguides of a quadrant is affected a waveguide switching means 33 comprising a first curved shaped waveguide 34 (FIG. 6), one end 35 of which opens at the peripheral edge of a disk 36, with axis 37, at an angular distance from the other end 38 equal to $\pi/2$. The waveguide switching means comprises a second curved shared waveguide 39, the ends 41 and 42 whereof are also angularly displaced of $\pi/2$. The disk carrying the waveguides 34 and 39 is adapted to rotate about its axis 37.

Figure 6:
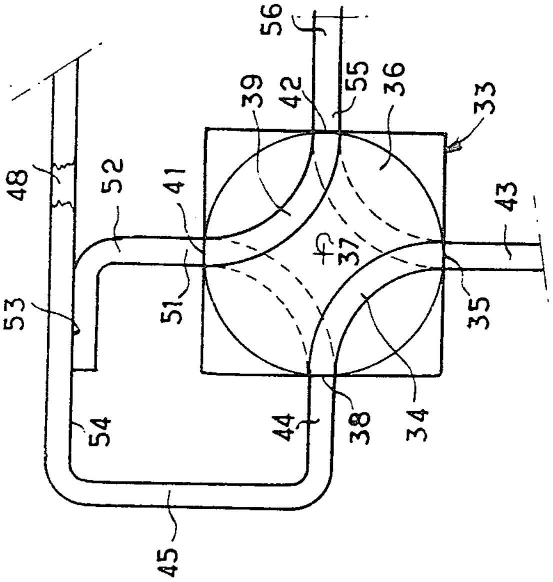
FIG. 6 is a schematic view of a waveguide switching means.

In the first condition shown in full line in FIG. 6 of the waveguide switching means 33, which corresponds for instance to the upper left hand quadrant of FIG. 3, the end 35 of the waveguide 34 registers with the end of a waveguide 43 connected to the radar apparatus and the other end 38 then registers with the end 44 of a waveguide 45 the other end 46 (FIG. 3) whereof is joined side by side with the back face of the feed waveguide element *23'a* at mid height of this latter, a slot provided in the front face 48 of the waveguide 45 overlaying a slot provided in the back face of the feed waveguide element *23'a.*

In the condition of the waveguide switching means 33 shown in full line, also, the end 41 of the curved shaped waveguide 39 registers with the end 51 of a coupling waveguide or coupler 52 one wall 53 whereof is in contact with a wall 54 of the waveguide 45, openings provided in said walls enabling the derivation of a portion of the radiating energy flowing inside the waveguide 45 towards the coupler 52.

In this condition also, the other end 42 of the curved shaped waveguide 39 registers with the end 55 of a waveguide 56, similar to the waveguide 45 but terminating through its end 57*a* (FIG. 3) at mid height of the waveguide element 23"*a*.

A similar arrangement is provided for each one of the other quadrants *b, c* and *d*, the feeders of each one of the four quadrants having been schematised by the points P*a*, P*b*, P*c*, P*d* in FIG. 3.

Figure 7:
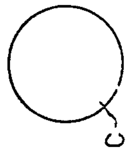
FIG. 7 is a schematic view of the cross-section of a radiation beam.

In the first condition of the waveguide switching means 33, the feeding elements 23' are fed through a circuit which comprises the curved waveguide 34 and the waveguide 45; the elements 23" are fed through a circuit which comprises the curved waveguide 34, a portion of the waveguide 45 up to the wall 53, the coupler 52, the curved waveguide 39 and the waveguide 56. In this condition of the waveguide switching means 33, all the radiating waveguides 11 are fed and the radiating surface of the antenna can be schematised by a circle C bounded by the circumference 21 (FIG. 7). The radiated beam is then a beam of revolution with axis perpendicular to the plane of the flat antenna and passing through its centre 22.

Figure 8:
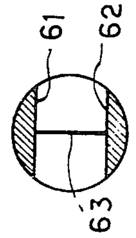
FIG. 8 is a view similar to that of FIG. 7, but for another condition of the antenna.

In a second condition of the flat antenna the waveguide switching means are brought through a $\pi/2$ rotation, in the position schematised in dotted line in FIG. 6. In this condition of the waveguide switching means, the radiating energy incoming through the waveguides 43 is led by means of the curved waveguides 39 to the feeding waveguides 56 and only the elements 23" are fed, excluding the elements 23'. It results therefrom that only the radiating waveguides 11 corresponding with the elements 23" radiate any energy. These are the waveguides which are comprised between the lines 61 and 62 of the diagram of FIG. 8. The segments of antenna shown shaded in this figure do not radiate at all. The width of the beam in the direction of the line 63 perpendicular to the lines 61 and 62 is smaller than in the other condition of the antenna. The beam has then a substantially elliptical cross-section.

Figure 9:
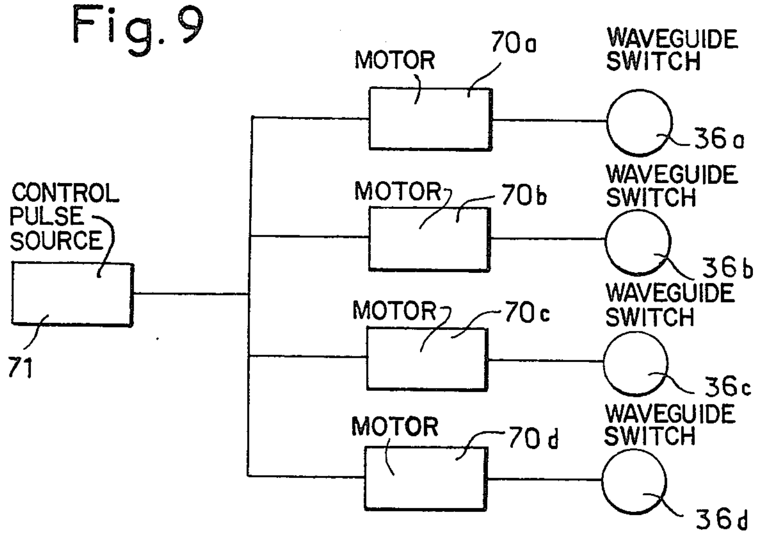
FIG. 9 is a schematic view of a waveguide switching means actionning device.

In the embodiment described, an electrical control device for the position of the disks 36 is provided for (FIG. 9), adapted to action simultaneously, through control pulses, each one of the disks 36. This device comprises a control pulses emitter 71 the output whereof is coupled to the input of four electric motors 70*a*, 70*b*, 70*c*, 70*d* respectively, the condition of each one of these electric motors determining the position of one of the disks 36*a*, 36*b*, 36*c*, 36*d*. The control pulses emmitter 71, actioned by the operator of the radar apparatus, sends an electric control pulse to the four electric motors simultaneously, the shafts of said motors rotating then in such manner that the corresponding disc 36 changes from one of its positions to its other position, for instance from the first position to the second position.

In another embodiment, the switching is made in an electronic way.

This invention provides for switchings ensuring a distribution of the feed of the different radiating waveguides different from that described above, to satisfy other conditions of use.

What is claimed is:

1. A flat radar antenna with a center, comprising:

a plurality of slotted aligned waveguide elements disposed in parallel rows, with coplanar slotted radiating faces, said waveguide elements being grouped for their feeding according to four quadrants, four adjustable feed circuits, each connecting one of said quadrants with a common radar circuit, any given feed circuit connected to a corresponding quadrant being adapted to take on two conditions for adjusting the quantity of energy flowing between said waveguide elements and the radar apparatus circuit, a first condition in which it feeds all the waveguides in said corresponding quadrant and a second condition in which it feeds only the rows nearest to the center of the antenna excluding the other waveguides in said corresponding quadrant, and control means for the four feed circuits to take on at the same time the same condition, so that the radar antenna may emit a radar beam which is symmetrical relatively to an axis passing through the center of the antenna, and having a different configuration according to the condition of the feed circuits.

2. The antenna as claimed in claim 1, wherein the peripheral ends of the radiating waveguides are disposed along a circumference, in such manner that the radar beam emitted by the antenna has a circular configuration when the feed devices are in their first condition and has a substantially elliptical cross-section when said feed devices are in their second condition.

3. A flat radar antenna with a center, connected to a radar circuit, comprising:

a plurality of aligned waveguide elements disposed in parallel rows, with coplanar slotted radiating faces, said waveguide elements being grouped for their feeding according to four quadrants, four adjustable feed circuits, each one of them connecting one quadrant with the radar circuit and comprising a first feed waveguide feeding the waveguides of said one quadrant the most distant from the center of the antenna and a second feed waveguide feeding the waveguides of said one quadrant the nearest to the center of the antenna, as well as a two way waveguide switch, which in its second condition feeds limitatively the second waveguide and which in its first condition feeds the first feed waveguide, a derivation of the first feed waveguide being then provided for the feeding of the second feed waveguide via the switch, and control means for the four switches to take on at the same time the same condition, so that the radar antenna may emit a radar beam which is symmetrical relatively to an axis normal to the antenna and passing through the center of the antenna, the beam having a different configuration according to the condition of the switches.

4. The antenna as claimed in claim 3, wherein said switch comprises a circular disc carrying two waveguides conformed according to circular arcs the ends of which are located on the circumference of said disc at an angular distance of $\pi/2$ from one another.

5. A flat radar antenna with a center comprising:

a plurality of slotted aligned waveguide elements disposed in parallel rows, with coplanar slotted radiated faces, said waveguide elements being grouped for their feeding according to four quadrants, and four adjustable feed circuits, each connecting one of said quadrants with a common radar circuit, any given feed circuit connected to a corresponding quadrant being adapted to take on two conditions for adjusting the quantity of energy flowing between said waveguide elements and the radar apparatus circuit, a first condition in which it feeds all the waveguides in said corresponding quadrant a second condition in which it feeds only the rows nearest to the center of the antenna excluding the other waveguides in said corresponding quadrant.

6. A flat radar antenna with a center, connected to a radar circuit, comprising:

a plurality of aligned waveguide elements disposed in parallel rows, with coplanar slotted radiating faces, said waveguide elements being grouped for their feeding according to four quadrants, and four adjustable feed circuits, each one of them connecting one quadrant with the radar circuit and comprising a first feed waveguide feeding the waveguides of said one quadrant the most distant from the center of the antenna and a second feed waveguide feeding the waveguides of said one quadrant the nearest to the center of the antenna, as well as a two way waveguide switch, which in its second condition feeds limitatively the second feed waveguide and which in its first condition feeds the first feed waveguide, a derivation of the first feed waveguide being then provided for the feeding of the second feed waveguide via the switch.

* * * * *

UNITED STATES PATENT OFFICE
CERTIFICATE OF CORRECTION

Patent No. 4099181 Dated July 4, 1978

Inventor(s) Antoine Scillieri and Jean Yves Aubry

It is certified that error appears in the above-identified patent and that said Letters Patent are hereby corrected as shown below:

In the abstract, line 10 change "conditios" to --conditions--.

Column 4, line 66 change "radiated" to --radiating--.

Signed and Sealed this

Thirteenth Day of February 1979

[SEAL]

Attest:

RUTH C. MASON
*Attesting Officer*

DONALD W. BANNER
*Commissioner of Patents and Trademarks*